United States Patent
Sun et al.

(10) Patent No.: US 9,622,265 B2
(45) Date of Patent: Apr. 11, 2017

(54) SYSTEM AND METHOD FOR A CSMA-CA HALF WINDOW SCHEME

(71) Applicant: Huawei Technologies Co., Ltd., Shenzhen (CN)

(72) Inventors: Sheng Sun, Kanata (CA); Jung Hoon Suh, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 236 days.

(21) Appl. No.: 14/309,521

(22) Filed: Jun. 19, 2014

(65) Prior Publication Data

US 2014/0376532 A1 Dec. 25, 2014

Related U.S. Application Data

(60) Provisional application No. 61/836,942, filed on Jun. 19, 2013.

(51) Int. Cl.
*H04W 74/08* (2009.01)
*H04W 84/12* (2009.01)

(52) U.S. Cl.
CPC ........ *H04W 74/0816* (2013.01); *H04W 84/12* (2013.01)

(58) Field of Classification Search
CPC .................. H04W 84/12; H04W 74/0816
USPC ....................................... 370/338
See application file for complete search history.

(56) References Cited

U.S. PATENT DOCUMENTS

| | | | |
|---|---|---|---|
| 2006/0245447 A1 | 11/2006 | Chou et al. | |
| 2013/0070781 A1* | 3/2013 | Vedantham | H04L 12/413 370/447 |
| 2013/0089036 A1* | 4/2013 | Cho | H04W 74/085 370/329 |

OTHER PUBLICATIONS

IEEE, "IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications," IEEE Draft P802.11-REVmb/D12, Nov. 2011, 2910 pages.
International Search Report received in Application No. PCT/US14/43257, mailed Oct. 28, 2014, 8 pages.

* cited by examiner

*Primary Examiner* — Andrew Lai
*Assistant Examiner* — Albert Shih
(74) *Attorney, Agent, or Firm* — Slater Matsil, LLP

(57) ABSTRACT

Embodiments are provided for implementing a CSMA-CA half window scheme in 802.11 networks or other suitable wireless networks that could benefit from such scheme. The half window scheme improves a back-off time calculation by adding a probability prediction factor. The back-off time is part of a delay time in accessing a wireless transmission medium by a station (STA). The probability prediction factor is used to adjust a contention widow (CW) used to calculate the back-off time, based on the STA's medium access probability. The STA splits the CW into two at least half windows and then chooses one of the windows according to the window's information gain for the probability prediction. The selected window is used to select a random number for the back-off time. The improved back-off time calculation reduces contention between STAs in accessing the medium.

24 Claims, 3 Drawing Sheets

SYSTEM AND METHOD FOR A CSMA-CA HALF WINDOW SCHEME

This application claims the benefit of U.S. Provisional Application No. 61/836,942 filed on Jun. 19, 2013 by Sheng Sun et al. and entitled "System and Method for CSMA-CA Half Window Scheme," which is hereby incorporated herein by reference as if reproduced in its entirety.

TECHNICAL FIELD

The present invention relates to wireless communications, and, in particular embodiments, to a system and method for a carrier sense multiple access with collision avoidance (CSMA-CA) half window scheme.

BACKGROUND

In current CSMA-CA scheme for IEEE 802.11 (WiFi) communications, a station (STA) delays its access to a medium for transmitting data by a determined back-off time, e.g., in microseconds (μsec). The back-off time is calculated by selecting a random number from a predetermined contention window size. A Markov Chain analysis of throughput using this formula for calculating the back-off time reveals that the peak throughput can be sustained at about 70% of the overall throughput in normal network conditions (acceptable density of STAs or transmissions). The contention window size is increased or decreased based on previous success or failure according to detection of collisions with other STA transmissions. An improved scheme for determining the back-off time that results in fewer collisions between STAs and higher overall throughput is favorable, such as for relatively large STA or transmission concentration.

SUMMARY OF THE INVENTION

In accordance with an embodiment, a method performing carrier sense multiple access with collision avoidance (CSMA-CA) by a station in a wireless communications network includes collecting information regarding previous attempts of accessing with delay a medium designated for transmitting data. The delay includes a back-off time determined according to a contention window. The method further includes determining, in accordance with the information, a probability value of success in accessing the medium for each one of a plurality of window sections of the contention window, and selecting, from the window sections, a window section in accordance with the determined probability value of success for the selected window section.

In accordance with another embodiment, a method performing CSMA-CA by a station in a wireless communications network includes collecting a data set regarding previous attempts of accessing a data transmission medium with a delay according to previous back-off time values determined according to a contention window. The method further includes splitting the contention window into a first half window and a second half window, and calculating, in accordance with the data set, a first probability value of success in accessing the medium for the first half window. A second probability value of success in accessing the medium for the second half window is further calculated in accordance with the data set. One of the first half window and the second half window is then selected in accordance with one of the first probability value of success for the selected first half window and the second probability value of success for the selected second half window, and used to generate a random number for determining a back-off time.

In accordance with yet another embodiment, a communications device supporting CSMA-CA comprises at least one processor and a non-transitory computer readable storage medium storing programming for execution by the at least one processor. The programming includes instructions to collect information regarding previous attempts of accessing with delay a medium designated for transmitting data. The delay includes a back-off time determined according to a contention window. The programming further includes instructions to determine, in accordance with the information, a probability value of success in accessing the medium for each one of a plurality of window sections of the contention window, and select, from the window sections, a window section in accordance with the determined probability value of success for the selected window section. The device is also configured to determine a new back-off time according to the selected window section.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
FIG. 1 illustrates a clear channel assessment (CCA) scheme.

FIG. 1 shows a current clear channel assessment (CCA) scheme for IEEE 802.11 for accessing the medium by STA, for example. As used herein, the STA can be any user wireless device or access point (AP). Examples of the STAs include smartphones, computer tablets, laptop computers, and desktop computers. The APs are any devices that allow other STAs to access a wireless network, e.g., a WiFi network. Before accessing the medium to send data, an STA (or AP) waits an inter-frame space (IFS) time. The STA further delays its data transmission by a back-off time (e.g., in (μsec) after the IFS time to guarantee enough delay time for avoiding collision with another transmission (from another STA). The STA also waits an IFS time after its data transmission to receive an acknowledgment (Ack) signal.

Figure 2:
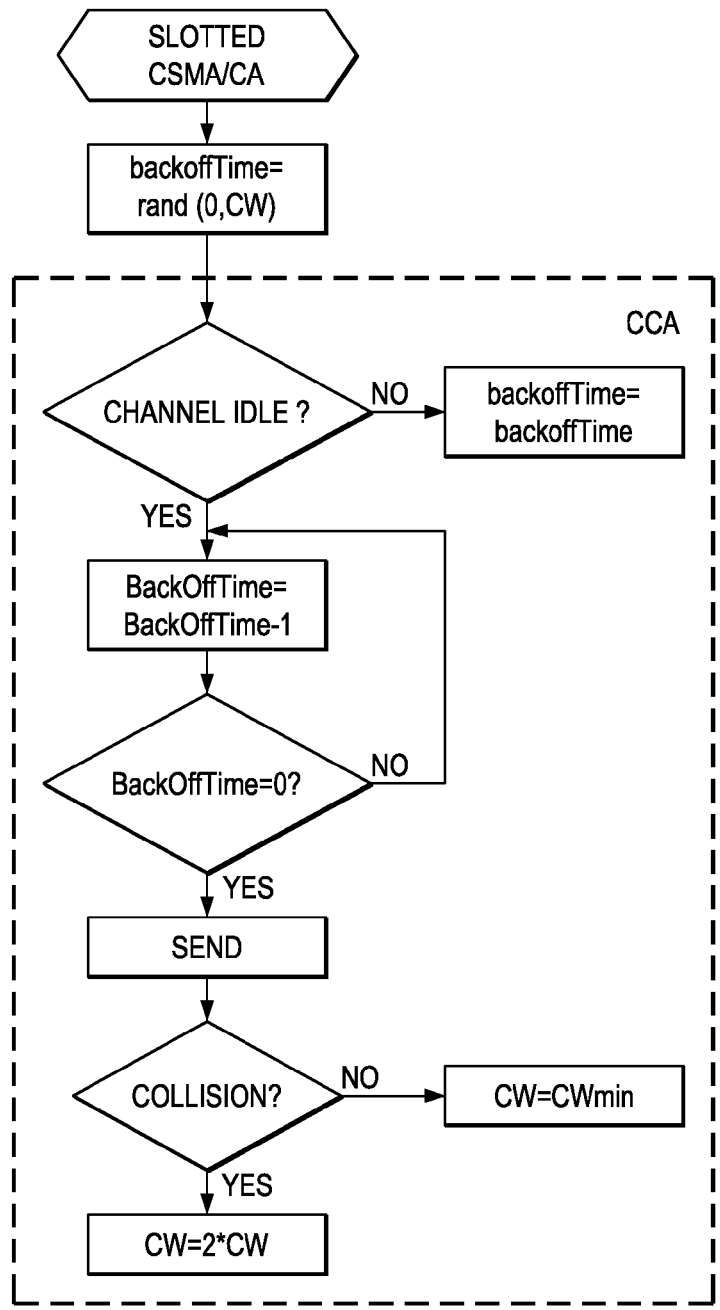
FIG. 2 illustrates a carrier sense multiple access with collision avoidance (CSMA-CA) scheme.

In the current CSMA-CA scheme for IEEE 802.11, the back-off time for accessing the medium is calculated (by a STA) by randomly selecting a number (an integer) between 0 and a predetermined contention window (CW) size, and then multiplying the number by a predefined (minimum) time slot, e.g., in μsec. The CW size is bound by a predefined minimum CW size (CWmin) and a predefined maximum CW size (CWmax). Further, according to the CSMA-CA scheme, the CW size is either increased or decreased based on collision detection in accessing the medium. For example, the CW size is doubled in the case of previous failure in accessing the medium, or reset to a minimum size, CWmin, in case of no collision. The CSMA-CA algorithm is shown in FIG. 2.

An 802.11 station (STA) uses the following standard equation to calculate the back-off time: Back-offTime=Random(0, CW)×Slot time, where CW is bound by CWmin and CWmax, Random( ) is a random number function generator, and Slot time is the predefined time slot. The algorithm can be expressed as follows:
Choose random waiting time between [CWmin, CWmax];
CCA:

```
if (Idle)
    Back-offTime=Back-offTime−1;
    if (Back-offTime=0), send;
        if (collision)
            CW=2 × CW;
        else Back-offTime=0 and send;
    else Back-offTime=Back-offTime−1;
else
    CW=CW.
```

Embodiments are provided herein for implementing a CSMA-CA half window scheme in 802.11 networks or other suitable wireless networks that could benefit from such scheme. The half window scheme is provided to improve the back-off time calculation by adding a probability prediction factor. The probability prediction factor is used to adjust the CW based on the STA's medium access probability. In the half window scheme, the STA builds a decision tree based on the information gain (G) for the probability prediction. The decision tree splits the CW into two half windows. The STA then chooses one of the half windows from which to select a random number for the back-off time, as described in detail below. The two half windows are a left half window (CWmin≤X≤CWhalf) and a right half window (CWhalf≤X≤CWmax), where the CWhalf=(CWmax−CWmin)/2, and X is the number chosen from one of the two half windows. The half window scheme improves substantially the overall throughput. In other embodiments, the CW is split into more than two half windows to select the random number for the back-off time.

The half window scheme is based on adjusting or tuning the random number function generator Random( ) by selecting an appropriate CW size with higher probability of success in selecting the back-off time (less likelihood of collision). The CW is adjusted based on a probability function (p). The function p is calculated by using the differential information gain (G) of the entropy (E) for each half window. The STA is first trained using historical information $S=\{(r1,st1);(r2,st2);(r3,st3) \ldots ;(rn,stn)\}$, where r is the random generated real number (between 0 and 1) based on Random( ) and st denotes the Boolean state (success or failure) for accessing the medium. After the training phase, the STA calculates the gain for each half window and chooses the proper half window based on the gain. The process can be repeated by the STA, e.g., at each access of the medium.

The CSMA-CA half window scheme makes use of the historical success/failure information for accessing the medium without collision to predict the next access CW by tuning the random number function generator into two half windows. The training phase processes the historical information to evaluate success probability of each half window, and a next half window phase adjusts the CW for selecting the random number for back-off time based on the probability. The scheme utilizes entropy calculation and an information gain equation, and creates accordingly a decision tree for the two half windows. The decision tree is a state running in the STA that calculates the information gain and the entropy based on the historical information, and then makes the decision on which half window to choose.

In the training phase, the STA collects its historical window information set, $S\{(r, st)\}$, where r is the random generated real number, and st denotes a Boolean state that is either success (denoted as +) or failure (denoted as −). For example, S cab be $\{(199,−);(83,+);(156,+); (136,−);(251,+); (177,+);(103,+);(206,−);(58,−);(130,+);(226,−);(62,+); (152,+);(242,+)\}$. There are 14 samples in the S, where 9 previous attempts to access the medium are with success (+), and 5 are with failure (−), which is denoted as (9+,5−). Thus, the entropy is calculated as $E(9+,5−)=−9/14 \log_2(9/14)−5/14 \log_2(5/14)=0.94$. The entropy may also be calculated using any suitable function other than the logarithmic function ($\log_2$), such as using any suitable hardware (chip) or software implementation. A suitable implementation may be based on cost, power requirement, computation speed, accuracy, or other system design criteria.

Next, in the half window phase, the STA builds the decision tree based on the obtained information gain. The information gain is calculated based on the obtained entropy E above. The information gain can be obtained using the formula:

$$\text{Gain}(S, A) = \text{Entropy}(S) - \sum_{v=Value(A)} \frac{|S_v|}{|S|} \text{Entropy}(S_v).$$

Figure 3:
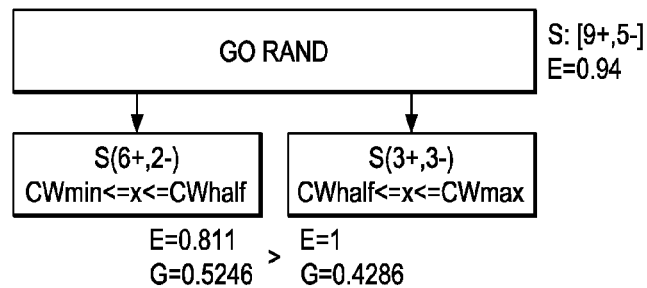
FIG. 3 illustrates a half window scheme decision tree according to an embodiment of the disclosure.

In the example above with $S=(9+,5−)$, the entropy for a left window $S(31 \leq X \leq 112)=[6+,2−]$ is $E=0.811$, and the entropy for a right window is $S(112<X \leq 255)=[3+,3−]$ is $E=1$, wherein CWmin=31, CWhalf=112, and CWmax=255. Thus, the Gain of $S(31 \leq X \leq 112)=0.94−(8/14)0.811$, and the Gain of $S(112<X \leq 255)=0.94−(6/14)1=0.4286$. The calculations for the two sets form the two branches of the decision tree, as shown in FIG. 3. Since Gain of $S(31 \leq X \leq 112)>$Gain of $S(112<X \leq 255)$, the STA chooses Random$(31 \leq X \leq 112)$ to obtain the random number for the back-off time.

Figure 4:
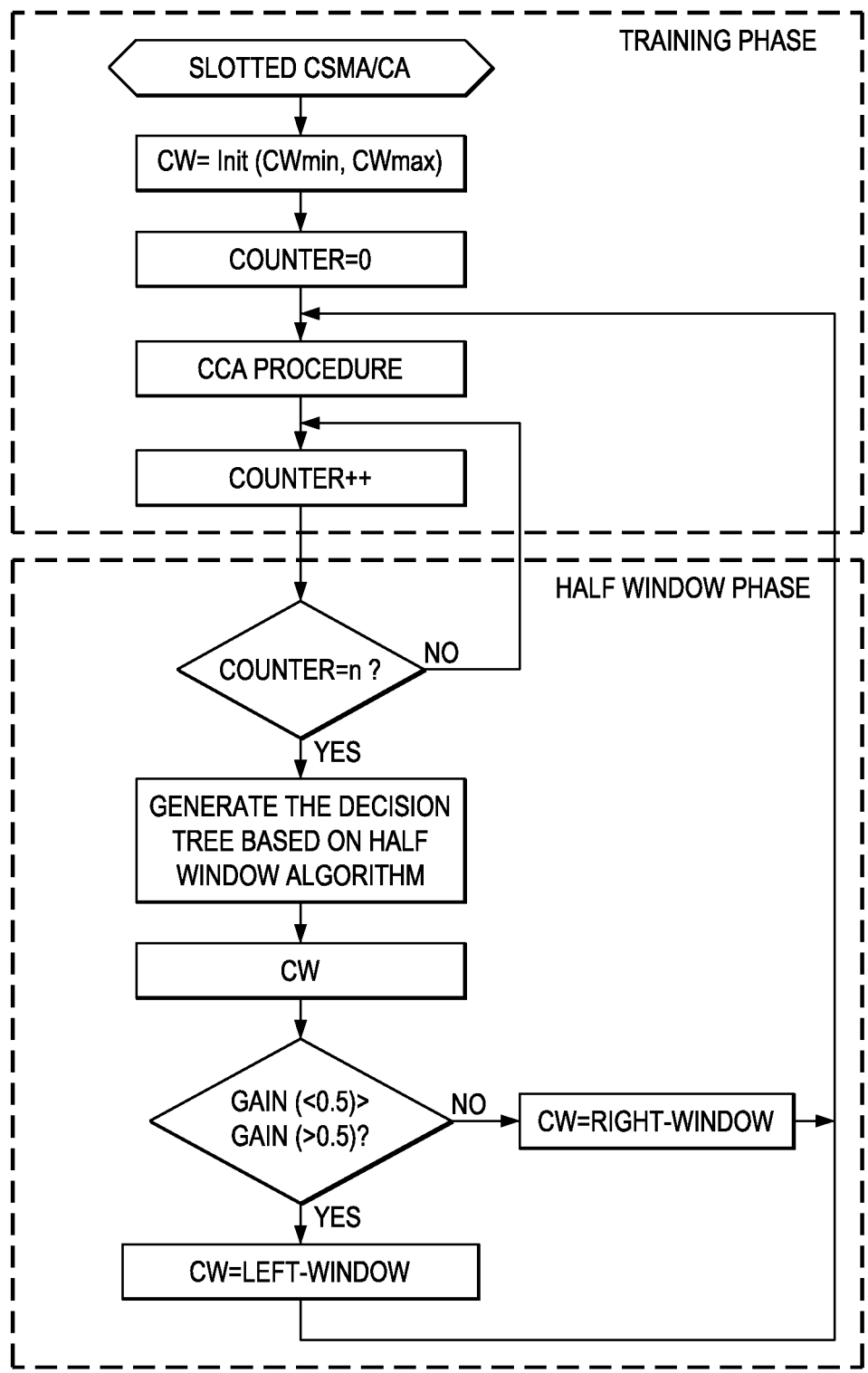
FIG. 4 illustrates a half window scheme according to an embodiment of the disclosure.

FIG. 4 shows an embodiment of a half window algorithm including the timing phase and the half window phase described above. In the figure, the left window (or half window) is denoted by (<0.5), and the right window by (>0.5). A counter is used to determine when to generate the decision tree. The counter time is set to ensure gathering enough historical samples of success/failure results in accessing the medium that allow probability prediction with sufficient accuracy, and hence guarantee choosing the half window properly.

The improved CSMA-CA half window scheme can be adopted by modifying the 802.11 CSMA-CA procedure to include the following formulas for calculating the back-off time: back-offTimeReg=Rand(0, CW)*Slot time for the typical back-off time calculation (without improvement; back-offTimeHwL=Random(CWmin, CWhalf)*Slot time for the case of choosing the left window (half window); and back-offTimeHwH=Random(CWhalf, CWmax)*Slot time for the case of choosing the right window (half window).

In the embodiment above, the contention window is split into two half windows to build a decision tree with two branches. In other embodiments, the window can be split into any suitable number of smaller windows to build a decision tree with more than two branches. For example, the window can be split into the 4 windows: (CWmin≤X<CW(¼), CW(¼)<X≤CW(½), CW(½)<X=CW(¾), CW(¾)<X≤CWmax), where CW(¼)=(CWmax−CWmin)/4, CW(½)=(CWmax−CWmin)/2 and CW(¾)=(CWmax−CWmin)×¾. Other number of windows can also be used, such as 3, 5, 6, 7, 8, or others. In further embodiments, the windows may not be evenly slotted, wherein some windows may be larger or smaller than other windows. In any of these embodiments, the entropy and the information gain are calculated in accordance with the number of windows and their sizes.

Figure 5:
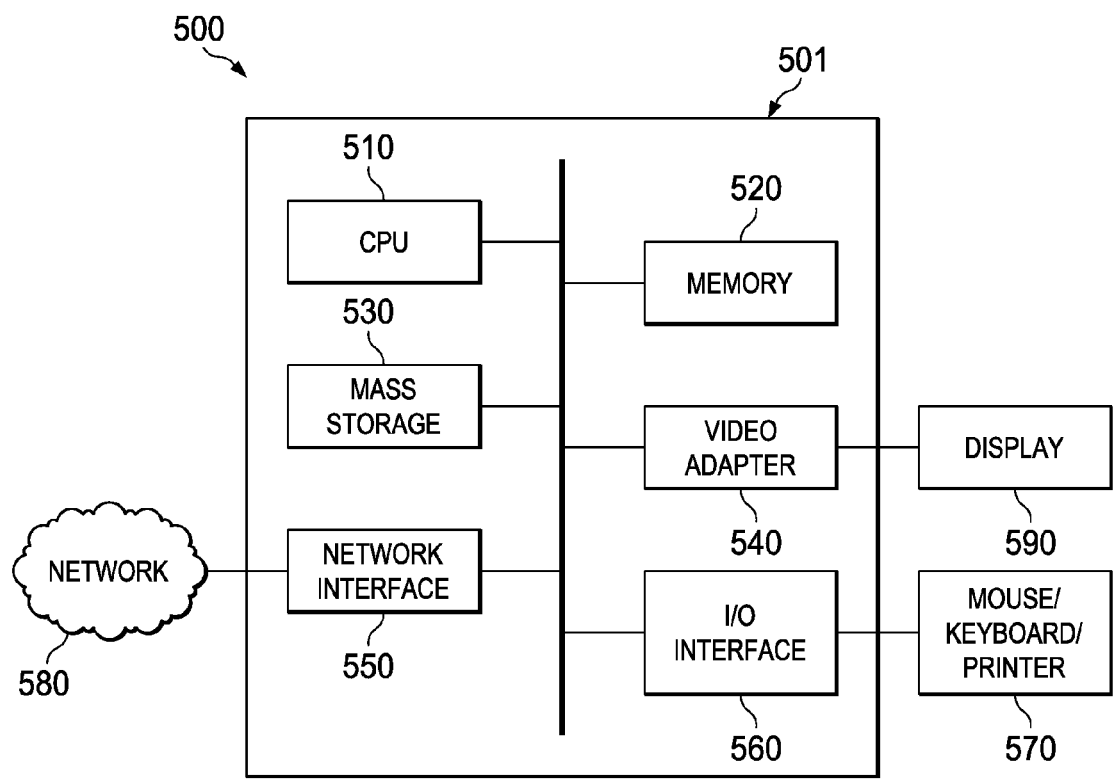
FIG. 5 is a diagram of a processing system that can be used to implement various embodiments.

FIG. 5 is a block diagram of a processing system 500 that can be used to implement various embodiments. The processing system 500 can be part of a STA or other network devices. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, a memory 520, a mass storage device 530, a video adapter 540, and an I/O interface 560 connected to a bus. The bus may be one or more of any type of several bus architectures including a memory bus or memory controller, a peripheral bus, a video bus, or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The video adapter 540 and the I/O interface 560 provide interfaces to couple external input and output devices to the processing unit. As illustrated, examples of input and output devices include a display 590 coupled to the video adapter 540 and any combination of mouse/keyboard/printer 570 coupled to the I/O interface 560. Other devices may be coupled to the processing unit 501, and additional or fewer interface cards may be utilized. For example, a serial interface card (not shown) may be used to provide a serial interface for a printer.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performing carrier sense multiple access with collision avoidance (CSMA-CA) by a station in a wireless communications network, the method comprising:
   collecting, by the station, information regarding previous attempts of accessing with delay a medium designated for transmitting data, wherein the delay includes a back-off time determined according to a contention window;
   determining, by the station in accordance with the collected information, an information gain for each one of a plurality of window sections of the contention window, wherein a full length of the contention window is split into the window sections, and wherein the window sections are concurrent and non-overlapping;
   determining, by the station in accordance with each respective information gain, a probability value of success in accessing the medium for each one of the window sections of the contention window; and selecting, by the station from the window sections, a window section in accordance with the determined probability value of success for the selected window section.

2. The method of claim 1, wherein the step of selecting includes selecting the window section having a highest probability value of success.

3. The method of claim 1 further comprising determining a new back-off time according to the selected window section having a higher probability value of success.

4. The method of claim 3, wherein determining the new back-off time according to the selected window section includes generating, using a random number function generator, a value of the new back-off time from the selected window section.

5. The method of claim 1 further comprising:
implementing a clear channel assessment (CCA) procedure to access the medium, wherein the CCA procedure includes waiting an inter-frame space (IFS) time and the back-off time before transmitting the data on the medium;
incrementing a counter of performed CCA procedures each time upon implementing the CCA procedure; and
collecting a respective sample of the information.

6. The method of claim 5 further comprising:
repeating the CCA procedure, incrementing the counter, and collecting a respective sample of the information until the counter reaches a predefined maximum value; and
upon the counter reaching the predefined maximum value, starting the determining of the probability value of success for each one of the window sections.

7. The method of claim 1, wherein determining, in accordance with the collected information, an information gain for each one of the window sections of the contention window comprises:
determining, in accordance with the collected information, an entropy for each one of the window sections; and
determining, in accordance with the entropy, the information gain for each one of the window sections.

8. The method of claim 1, wherein the contention window is bound by a predefined minimum contention window size and a predefined maximum contention window size.

9. The method of claim 8, wherein the window sections are two half window sections including a left half window and a right half window, wherein the left half window is bound by the predefined minimum contention window size and a half size of the contention window, and wherein the right half window is bound by the half size of the contention window and the predefined maximum contention window size.

10. The method of claim 1, wherein the information is arranged in a set comprising a plurality of pairs of values, wherein each one of the pairs of values includes a Boolean state indicating success or failure of a corresponding previous attempt for accessing the medium without collision, and a randomly generated number between 0 and 1 used to determine the back-off time for the corresponding previous attempt.

11. A method performing carrier sense multiple access with collision avoidance (CSMA-CA) by a station in a wireless communications network, the method comprising:
collecting, by the station, a data set regarding previous attempts of accessing a data transmission medium with a delay according to previous back-off time values determined according to a contention window;
splitting, by the station, the contention window into a first half window and a second half window, wherein a full length of the contention window is split into the first half window and the second half window, and wherein the first half window and second half window are concurrent and non-overlapping;
calculating, by the station in accordance with the data set, a first information gain for the first half window;
calculating, by the station in accordance with the first information gain, a first probability value of success in accessing the medium for the first half window;
calculating, by the station in accordance with the data set, a second information gain for the first half window;
calculating, by the station in accordance with the second information gain, a second probability value of success in accessing the medium for the second half window;
selecting, by the station, one of the first half window or the second half window in accordance with one of the first probability value of success for the selected first half window or the second probability value of success for the selected second half window; and
generating, by the station, a random number for determining a back-off time from the selected one of the first half window or the second half window.

12. The method of claim 11, wherein the step of selecting includes selecting the one of the first half window or the second half window having a higher probability value of success.

13. The method of claim 11, wherein the data set is collected during a timing phase that precedes a half window scheme phase during which the first probability value of success and the second probability value of success are calculated.

14. The method of claim 13 further comprising during the timing phase:
initializing a counter;
implementing multiple instances of a clear channel assessment (CCA) procedure to access the data transmission medium, wherein the CCA procedure includes waiting an inter-frame space (IFS) time and a previously determined back-off time before transmitting the data on the medium;
incrementing the counter upon each instance of the instances of the CCA procedure;
adding to the data set a pair of values upon each instance of the instances of the CCA procedure; and
upon the counter reaching a predefined maximum value, starting the half window scheme phase.

15. The method of claim 13, wherein calculating the first information gain includes calculating a first entropy for the first half window in accordance with the data set, and wherein calculating the second information gain includes calculating a second entropy for the second half window in accordance with the data set.

16. The method of claim 15 further comprising during the half window scheme phase:
calculating entropy for the data set, wherein the first entropy and the first information gain for the first half window and the second entropy and the second information gain for the second half window are in accordance with the entropy for the data set; and
establishing a decision tree comprising a root including the data set and the entropy for the data set, a left leaf including the first entropy and the first information gain for the first half window, and a right leaf including the second entropy and the second information gain for the second half window.

17. The method of claim 11, wherein the wireless communications network is an IEEE 802.11 network, and wherein the station is one of a WiFi device or an access point (AP) of the IEEE 802.11 network.

18. A communications device supporting carrier sense multiple access with collision avoidance (CSMA-CA), the communications device comprising:
   at least one processor; and
   a non-transitory computer readable storage medium storing programming for execution by the at least one processor, the programming including instructions to:
      collect information regarding previous attempts of accessing with delay a medium designated for transmitting data, wherein the delay includes a back-off time determined according to a contention window;
      determine, in accordance with the collected information, an information gain for each one of a plurality of window sections of the contention window, wherein a full length of the contention window is split into the plurality of window sections, and wherein the plurality of window sections are concurrent and non-overlapping;
      determine, in accordance with each respective information gain, a probability value of success in accessing the medium for each one of the window sections of the contention window;
      select, from the window sections, a window section in accordance with the determined probability value of success for the selected window section; and
      determine a new back-off time according to the selected window section.

19. The communications device of claim 18, wherein the instructions to select the window section include instructions to select the window section having a highest probability value of success.

20. The communications device of claim 18, wherein the instructions to determine the new back-off time according to the selected window section include instructions to generate, using a random number function generator, a value of the new back-off time from the selected window section.

21. The communications device of claim 18, wherein the programming includes further instructions to:
   implement a clear channel assessment (CCA) procedure to access the medium, wherein the CCA procedure includes waiting an inter-frame space (IFS) time and the back-off time before transmitting the data on the medium;
   increment a counter of performed CCA upon implementing the CCA procedure; and
   collect a respective sample of the information.

22. The communications device of claim 21, wherein the programming includes further instructions to:
   repeat the CCA procedure, incrementing the counter and collecting a respective sample of the information until the counter reaches a predefined maximum value; and
   upon the counter reaching the predefined maximum value, start the determining of the probability value of success for each one of the window sections.

23. The communications device of claim 18, wherein the communications device is a WiFi station.

24. The communications device of claim 18, wherein the communications device is an Access Point (AP) of an IEEE 802.11 network.

* * * * *